United States Patent [19]
Pott

[11] 3,825,389
[45] July 23, 1974

[54] MOLDING HOLLOW ARTICLES

[75] Inventor: Heinrich Pott, Hilchenbach-Dahlbruch, Germany

[73] Assignee: Siemag Siegener Maschinenbau G.m.b.H., Hilchenbach-Dahlbruch, Germany

[22] Filed: June 26, 1972

[21] Appl. No.: 266,126

[30] Foreign Application Priority Data
July 1, 1971 Germany............................ 2132674

[52] U.S. Cl.................. 425/324 B, 425/DIG. 203, 425/DIG. 213
425/305 B, 425/381, 425/387 B
[51] Int. Cl.............................................. B29d 23/03
[58] Field of Search.. 425/381, DIG. 203, DIG. 204, 425/DIG. 206, DIG. 212, DIG. 213, 302 B, 305 B, 324 B, 326 B, 387 B, 380; 264/97, 98

[56] References Cited
UNITED STATES PATENTS
3,453,353  7/1969  Ninneman...................... 425/381 X

FOREIGN PATENTS OR APPLICATIONS
2,010,802  9/1971  Germany................... 425/DIG. 206

*Primary Examiner*—Richard B. Lazarus
*Attorney, Agent, or Firm*—Norman S. Blodgett; Gerry A. Blodgett

[57] ABSTRACT

Apparatus for forming a hollow body from thermoplastic material wherein a hollow pre-cast is formed around a blow rod and them blown in a mold, a neck being formed around the blow rod while the pre-cast is being formed.

15 Claims, 13 Drawing Figures

MOLDING HOLLOW ARTICLES

BACKGROUND OF THE INVENTION

It is well-known to fabricate hollow articles with a narrow neck, such as bottles, from thermoplastic material by means of the so-called "injection-blowing" procedure, so that the aeticles have a homogeneous structure and are not welded at any place. However, the fabrication of such hollow articles by the injection-blowing procedure has several disadvantages. For example, for the fabrication of the pre-cast, is is necessary to use high precision (and therefore expensive) molds. An absolute mold closure is possible only with the help of a clamp which works with high pressure. In addition, the blow rod, introduced into the injection mold as a mold core for the pre-cast can usually have only a diameter-length relationship of 1 to 3. A larger diameter-length relationship, based on the high injection pressure of the plasticized material, leads to a deviation of the rod within the injection mold and, consequently, to irregular wall thickness on the pre-cast. Furthermore, there are difficulties encountered with the known injection-blow procedure for an economical mass fabrication of plastic hollow bodies to adjust to each other timewise the two parallel-running procedures of injection and blowing.

The procedure described above, taught in German Pat. No. DT-AS 1,800,263, has an important advantage compared to the injection-blowing procedure in the fact that the pre-cast, with the help of relatively simple parts, can be made with a large diameter-length ratio of the molding core (blow rod) and that the production speed is only determined by the cooling time of the finished hollow body within the blow mold. A further advantage of this known procedure is that the shaping of a precast with a complicated distributed mass is controlled in a simple way, because the blow rod on one hand, can have a corresponding corss-section relationship and on the other hand, at the same time, the wall thickness distribution may exceptionally and effectively be influenced by the melting pressure and velocity of out-flow.

In addition to this procedure, of the present invention is to shape the neck of the pre-cast in the first stage and not within the final blow mold; this prevents the formation of a burr in the area of the neck.

A further purpose of this invention is the creation of a device for a logical execution of the steps of fabricating procedure. The solution of the problem, in accordance with the invention and the technical procedure, is achieved mainly in that, before removal of the blow rod from the dip pot, the neck of the pre-cast is injected around the blow rod in a mold held against the pot. In this way, necks which contain threads, collars, and other circumferential reductions may be fabricated easily and accurately.

The integral attachment of such a neck to the part of the pre-cast which is to be expanded thereafter by the blowing operation is achieved, according to a further expanded characteristic of this invention, in such a way that the plasticized material from the dip pot is injected into the neck mold.

SUMMARY OF THE INVENTION

In general, the invention consists of apparatus for the fabrication of hollow articles according to the abovedescribed procedure, by which a blow rod is alternately used as molding core for the pre-cast and as the blowing air inlet for the pre-cast while inserted into the hollow mold. The clamped or supported end of the blow rod is pushed lengthwise into a dip pot filled with plasticized material and pulled out of it. The neck mold can be opened and closed in the direction transverse to the longitudinal axis. Also, at the position of entry of the blow rod there is another slot which is pressed against a corresponding annular slot of the dip pot. The neck mold is formed as an injection mold, so that the annular slot within the dip pot, during the removal of the blow rod, forms a matrix for the molding of the pre-cast. The blow rod may be brought sidewise into a blow mold which consists of two halves and is transversely closable.

More specifically, a pusher piston extends into the dip pot at the end opposite the annular slot for driving out the plasticized material, which, in some cases, forms together with a valve seat arranged inside the dip pot, a closure of the dip pot against the extruder. In this case, it is of advantage that the valve seat be formed by the lower end of a socket which extends into the dip pot from the top and is displacable in axial direction by its threads. The socket may support a mouthpiece and on its upper end the annular slot is located at the point of introduction of the blow rod.

An especially practical and economical device for mass production according to this invention consists of two blow rods with associated throat molds mounted spaced from each other but side-by-side on a common carrier. The carrier is displacable axially and transversely and may be set into the blow mold alternately in the transverse direction. On a second carrier are arranged two dip pots spaced a distance equal to twice the distance between the two blow rods. During each of the production cycles, one of the blow rods is always in the vicinity of the dip pots and the other blow rod with the mounted pre-cast is received by the blow mold.

According to this invention, the blow rod carrier, as well as the carrier for the dip pots, sits in a closure press which is preferably hydraulically driven. The blow rod carrier is guided within and transversely to the work direction of the closure press in its open condition. Another characteristic of this invention is in that the neck mold consists of two halves which are kept in closed position by sloped guide pins and springs and are opened against the spring forces by pressure-media operated push rods. The tow neck mold halves, furthermore, are guided and displacable on a stripper plate which forms the upper closure of the neck mold, through which the springs, in their rest position, are kept on the blow rod carrier and are displacable by the push rods relative to the blow rod carrier in its stripper position.

The two blow mold halves may be guided and moved relative to each other transversely of their separation line and transversely of the displacement direction of a slide bar carrying the blow rod and mounted on the blow rod carrier. They are displacable against each other during opening of the closure press and are form-locked by sloped guide pins arranged on the dip pot carrier.

So that a satisfactory functioning of the blow rods for blowing air introduction can be guaranteed, each rod consists of an upper part, which is fastened stationary on the blow thorn carrier, and a lower part which is kept by springs against the upper part. Displacement between the blow mold halves are able to push away from the mold through a stationary lifting cam and through this method an opening is created between the two blow rod parts for the introduction of blowing air.

For a safe removal of the finished blown hollow bodies from the area of the blow mold, according to this invention, a pipe is kept underneath the blow mold. This pipe receives the hollow bodies pushed out of the blow mold and is also equipped with a cooling air jet. This pipe is positioned within a holding device which is movable by the closure press along with the blow rod carrier. So that the hollow bodies, after completed cooling, can be guided further inside the pipe, the air jet is arranged radially and removable from the pipe, by means such as a pressure media drive.

According to this invention the pre-cast is made with a finished neck, which then will be blown to the finished hollow body. This fabrication procedure of the pre-cast differs considerably from the corresponding procedures of the known injection-blowing fabrication procedures. The fabrication procedures according to this invention is shown in the FIGS. 1 to 4 of the drawing showing conditions at different consecutive time intervals.

Figure 1:
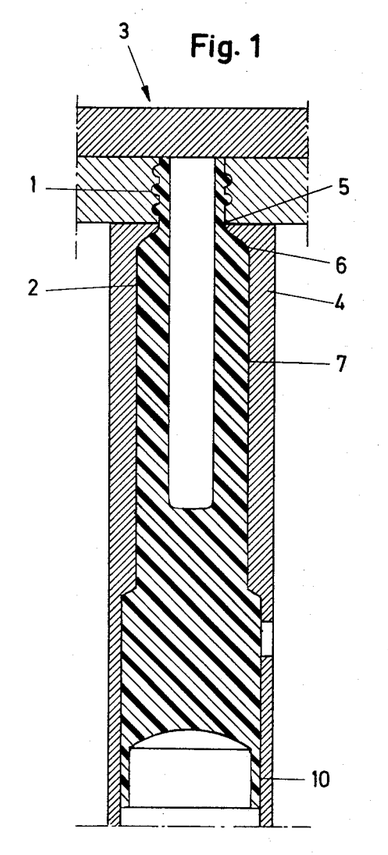
FIGS. 1–4 show different process steps of the fabrication procedure for the pre-cast, according to this invention.

The fabrication of the pre-cast is made as follows: the neck 1 of the pre-cast is first made according to the injection procedure. The injection molding of the neck 1 is made in such a way that a blow rod 2, serving as molding core, together with a surrounding neck mold 3 is set against a mouthpiece 4. During this operation, a mold opening 5 of the neck mold 3 is in exact congruence with the opening 6 of mouthpiece 4. The plasticized material 7, for forming the neck 1, is pressed into the hollow space between the rod 2 and the neck mold 3 coming from a plasticized unit, such as an extruder, through the mouthpiece 4, as can be seen in FIG. 1.

Figure 2:
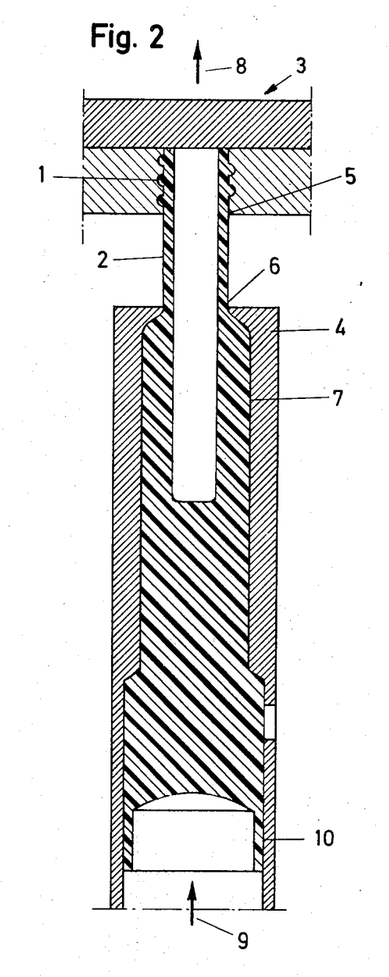
Figure 3:
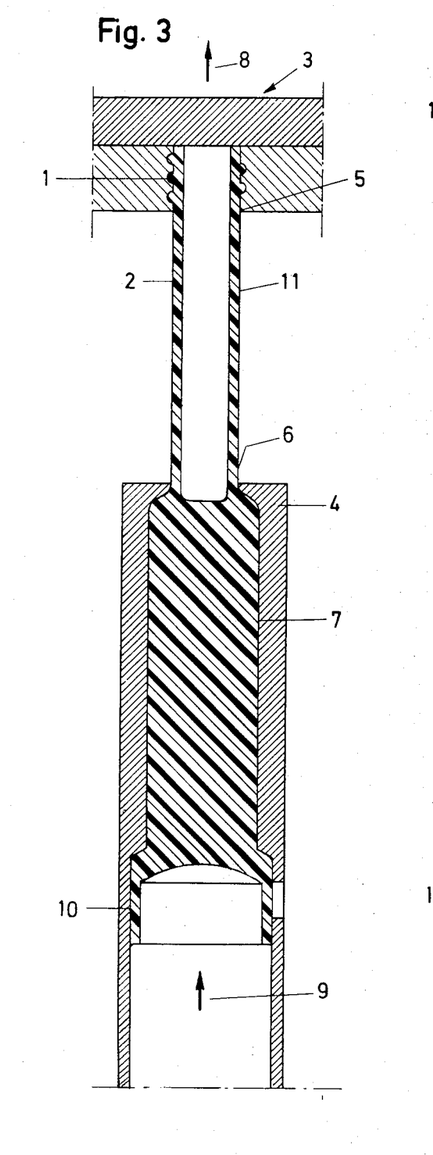
Figure 4:
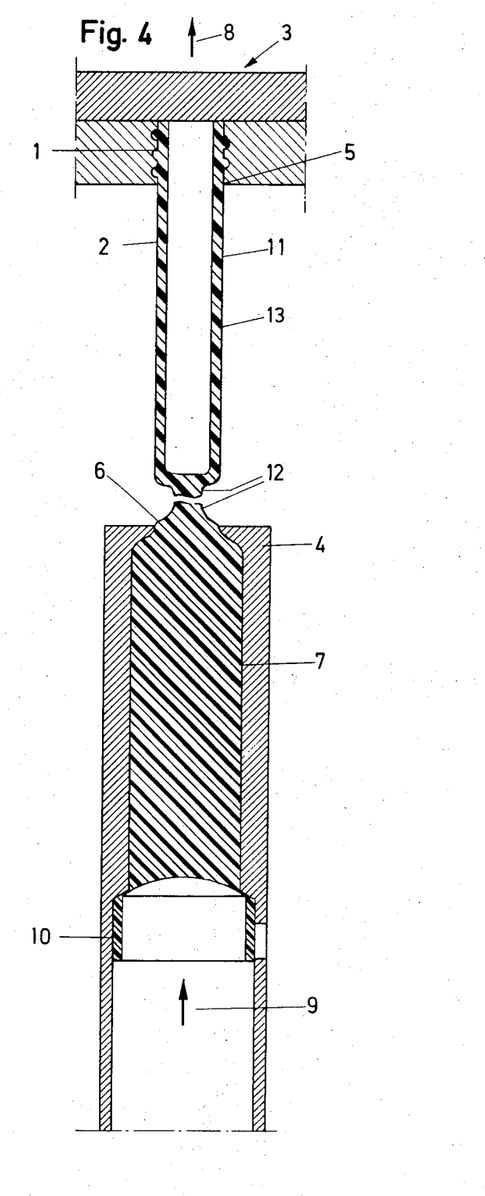

Thereafter, the rod 2 with the neck mold 3 is moved away from the mouthpiece 4 with predetermined speed in the direection of the arrow 8 and, at the same time, the plastic material 7 is pushed by a piston 10 from underneath into the mouthpiece 4 in the direction of the arrow 9 with a selected speed. By this method, a closed surrounding plastic annular cylinder 11 is carried by the moving rod 3 out of the mouthpiece 4 through the opening 6 (FIGS. 2 and 3). The opening closes itself off after the exit of the rod end from the mouthpiece 4, creating a protuberance 12 as shown in FIG. 4. This protuberance 12 then is removed by a cutting device after the rod end leaves, or it may tear itself loose after the movement of the piston 10 stops. By this means, the pre-cast 13, consisting of neck 1 and the pressed cylinder part 11 is integrally and homogeneously made. Thereafter, by blowing of the hollow cylinder 11 within a mold it is shaped into the finished product.

The apparatus for the fabrication of the pre-casts 13 remains during the shaping of the finished product, as shown in FIGS. 5 to 13. The main part of the apparatus is a hydraulic closure press 20 on which are mounted four columns 22 which extend upwardly from the lower construction 21 and which carry at their tops an end-plate 23. On top of this end-plate is mounted the actual closure cylinder 24 and its piston rod 25, operating through several stay bolts 26, lifts or lowers a carrier plate 27 with guidance on the four columns 22.

The carrier plate 27 is equipped with a guide prism and between them is held a bar-shaped guide block 29 displacable in length direction. For displacement of the guide block 29 a hydraulic or pneumatic cylinder 30 is mounted on the carrier plate 27.

Furthermore, the carrier plate 27 is equipped with guide ways 31 whcih extend transversely of the guide prism 28 and are located underneath it. Within these guide ways 31 are mounted the two mold halves 32 and 33 of the blow mold. The mold halves hang in the guides so as to be displacable at a right angle to the bar-shaped guide piece 29.

Also on the bar-shaped guide piece 29 are mounted two blow rods 2 located at a certain distance from each other and arranged in such a way that, by displacement of the guide piece 29, every one of the rods 2 may be positioned in the area of the axis of the blow mold, which is formed by moving together the two blow mold halves 32 and 33. The rod 2, when positioned outside of the axis of the blow mold, is then located parallel to the axis of a so-called dip pot 34 of which two are stationarily mounted on the frame 21 of the closure press 20. The distance between the two dip pots 34 parallel to the direction of displacement of the rod 2 carrying guide pieces 29 corresponds to twice the distance of the rods from each other, so that every rod 2, when it is positioned outside of the blow mold, is associated with a dip pot 34.

By lowering the carrier plate 27 by means of the hydraulic cylinder 24, the rod 2 (positioned outside the blow mold areas) enters the dip pot 34 associated with this rod from above. At the same time the two blow mold halves 32 and 33 are moved toward each other and locked together by inclined guide pieces 35 mounted stationarily on the frame 21 of the closure press. The pieces penetrate into correspondingly sloped holes 36 in the blow mold halves 32, 33 close to the rod 2 with the pre-cast 13 located on it.

During blowing of a pre-cast 13 within blow mold 32, 33 to a finished product, the injection molding for the neck 1 of the next pre-cast 13 occurs in the manner as described in connection with FIG. 1. The mouthpiece 4 is part of part of the dip pot 34 and the pusher piston 10 is part of the arrangement.

The design of the dip pots 34 is such that the mouthpiece 4 with the help of a sleeve 37 may be displaced in the axial direction inside the dip pot 34. This ability of the mouthpiece 4 to be displaced has the effect of bringing the mouthpiece end into such an elevation that it creates in every case an exact fit and play-free unit with the neck mold 3, when the rod is pushed into the dip pot 34.

The fabrication of the cylinder part 11 of the precast 13 around the rod 2 in the cylinder press-operation is made, as can be seen from the FIGS. 2 to 4, during the time the blow mold halves 32, 33 are opened for the release of the finished product. For this purpose, the carrier plate 27 is slowly lifted by the closure cylinder 24, so that the rod 2, with corresponding speed, is lifted from the dip pot 34 and at the same time the pressing of the part 11 of the next pre-cast 13 is made.

To make it possible to blow the pre-cast to the finished product within the blow mold 32, 33, the rods 2 (which actually are the molding cores) are designed as so-called "valve" blow rods. They consist of an upper rod part 38, held stationary on a guide piece 29 and of a lower rod part 39 continuing underneath. The rod part 38 is of sleeve-shaped design and its bore serves as a guide for the shaft part 40 of rod part 39. The shaft part 40 extends upwards out of the bore of rod part 38 and is secured from falling out by nuts 4. Underneath the nuts on the shaft part 40 is located a cup spring 42 which tries always to pull the rod part 39 tightly against the end of the rod part 38.

Between the shaft 40 of the rod part 39 and the bore of the cod part 38 are provided grooves 43 which permit the entering of air into the inside of the pre-cast 13 as soon as the lower rod part 39 is lifted from the upper rod part 38 against the closure forces of the spring 42.

The lifting of rod part 39 from the rod part 38 takes place forceably be means of a stationary cam 44 as soon as the corresponding valve blow rod 2 (with the help of guide piece 29) is pushed into the elevation of the blow mold 32, 33. The upper end of the shaft 40 will then meet the cam 44 and is, against the force of the spring 42, pushed somewhat downwardly. Ty this action, the rod part 39 lifts itself off the rod part 38 and opens up the path for the blowing of air to the inside of the pre-cast 13.

The cam 44 for opening and closing the valve blow rods 2 and 3 is located on the carrier plate 27 and is designed in such a way that it may be adjusted as needed to create on one hand a sufficient opening for the blow air and on the other hand to guarantee a good seal of the two rod parts 39 and 38 against each other.

The neck molds 3 and the rods 2 which serve the injection molding of the neck parts of the pre-casts 13 hang on the guide piece 29. Every neck mold 3 consists of the two mold halves 45 and 46 which are not only closed around the rod 2 during injection molding of neck part 1, but also, during the blowing operation within the blow mold 32, 33, surround the finished neck part 1 tightly. Only during the strip-off of the finished blown hollow body 47 (after the opening of the blow mold 32, 33) are the two halves 45, 46 of the neck mold moved apart for a short period of time.

The separation movement of the two halves 45, 46 of the neck mold 3 is activated by a pneumatic or hydraulic cylinder 48, which is located above the carrier plate 27 between the stay bolts 26 and is lifted together up or down with them. The pressure media cylinder 48 operates the push rods 49 in such a way that they are lowered to a pressure ring 50 which holds a strip plate 52 on guide pin 51 within guide piece 29 for lifting and lowering.

By means of springs 53, the stripper plate 52 is normally held in contact with the underside of the guide piece 29 on the pins 51. However, in case the cylinder 48 is put under pressure by the pressure media, then the push rods 49 drive downward and push the stripper plate 52 over the pressure ring 50 and the pins 51 against the action of springs 53 down and away from guide piece 29. Together with the stripper plate 52, the neck mold halves 45 and 46 move downwardly, because they are connected together.

The sloped guide pins 54, stationarily mounted on the guide piece 29, are angaged with correspondingly-sloped bores 55 in the two neck mold halves 45 and 46 and act as a driving apart of these neck mold halves. The two halves 45 and 46 of the neck mold also close and lock against each other when the pressure media cylinder 48 is released so that the srping 53 and the stripper plate 52 are pulled up again. The guide pins 54 can naturally also be attached to the neck mold halves 45 and 46 in place of the guide piece 29. In this case the guide piece 29 has to have corresponding bores 55.

So that the stripped hollow bodies 47 leave the apparatus in a certain, predetermined position of alignment, a cross bar is connected through coupling rods 56 with the liftable-and-lowerable carrier plate 27 which carries a guide pipe 58. The upper end of this guide pipe 58 is always kept close beneath the blow mold, so that finished blown hollow bodies 47, during stripping from the rod 2, are pushed into the guide pipe 58. Into this guide pipe 58 is brought a cooling air jet 59 in a radial direction by a pressure media cylinder 60, so that an after-cooling of the finished hollow bodies 47 is possible. So that the after-colled hollow bodies 47 may move out of the cooling area, the cooling air jet 59 is pulled out momentarily from the guide pipe 58 by a pressure media cylinder 60.

Figure 5:
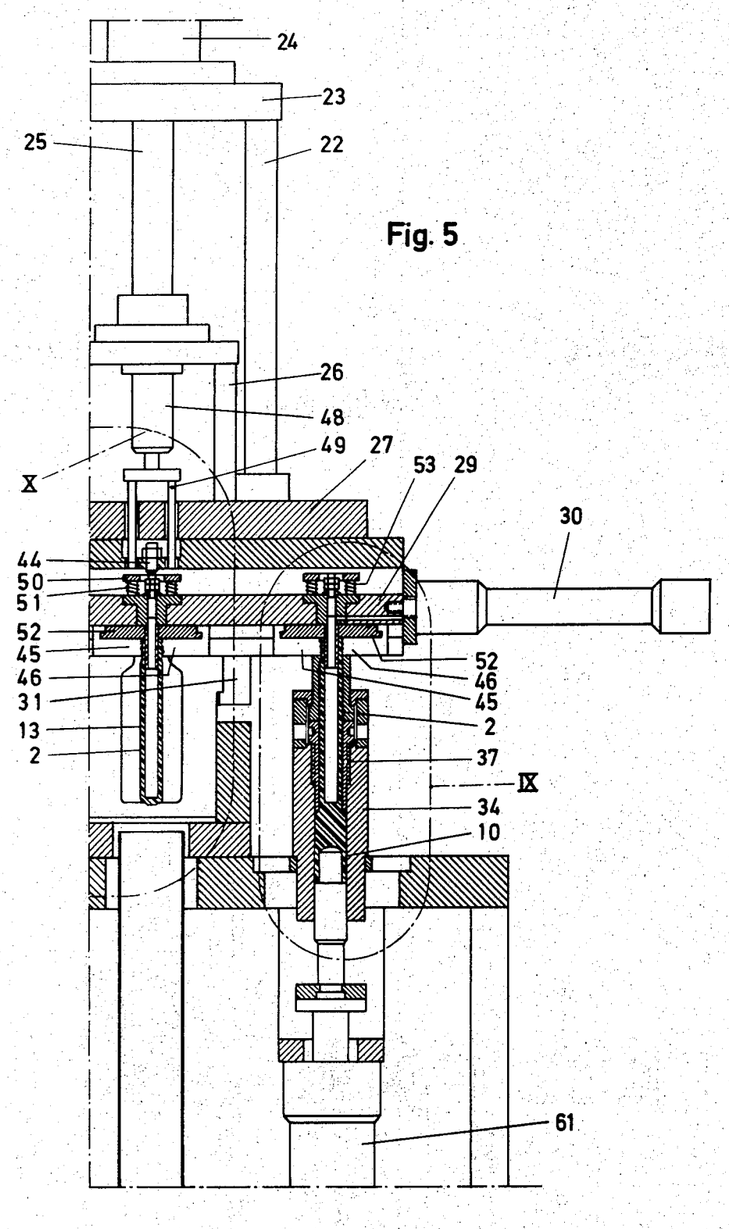
FIG. 5 is a vertical sectional view of a device for the execution of the process in work position which permits on one hand the injection molding of the neck of a pre-cast and on the other hand the blowing of a finished pre-cast to obtain the finished product.
Figure 6:
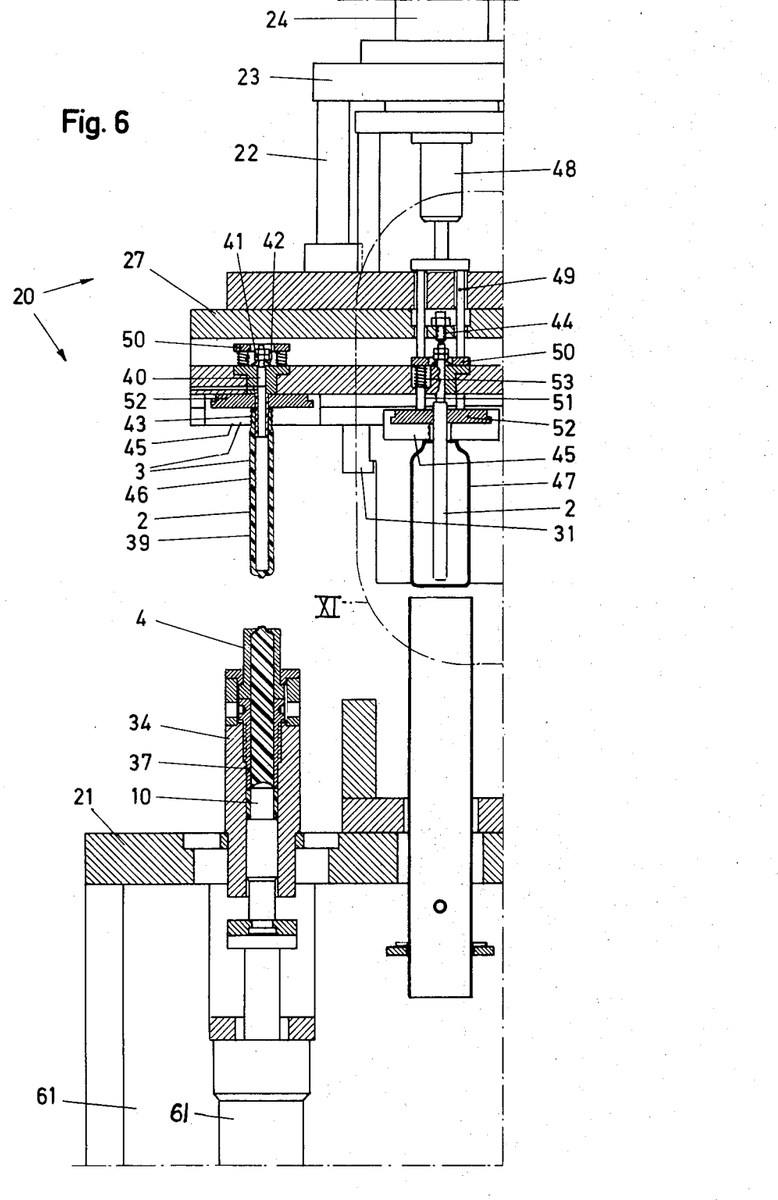
FIG. 6 is a vertical sectional view corresponding to FIG. 5, but in work position in which on one hand a pre-cast and on the other the finished product is being fabricated.
Figure 7:
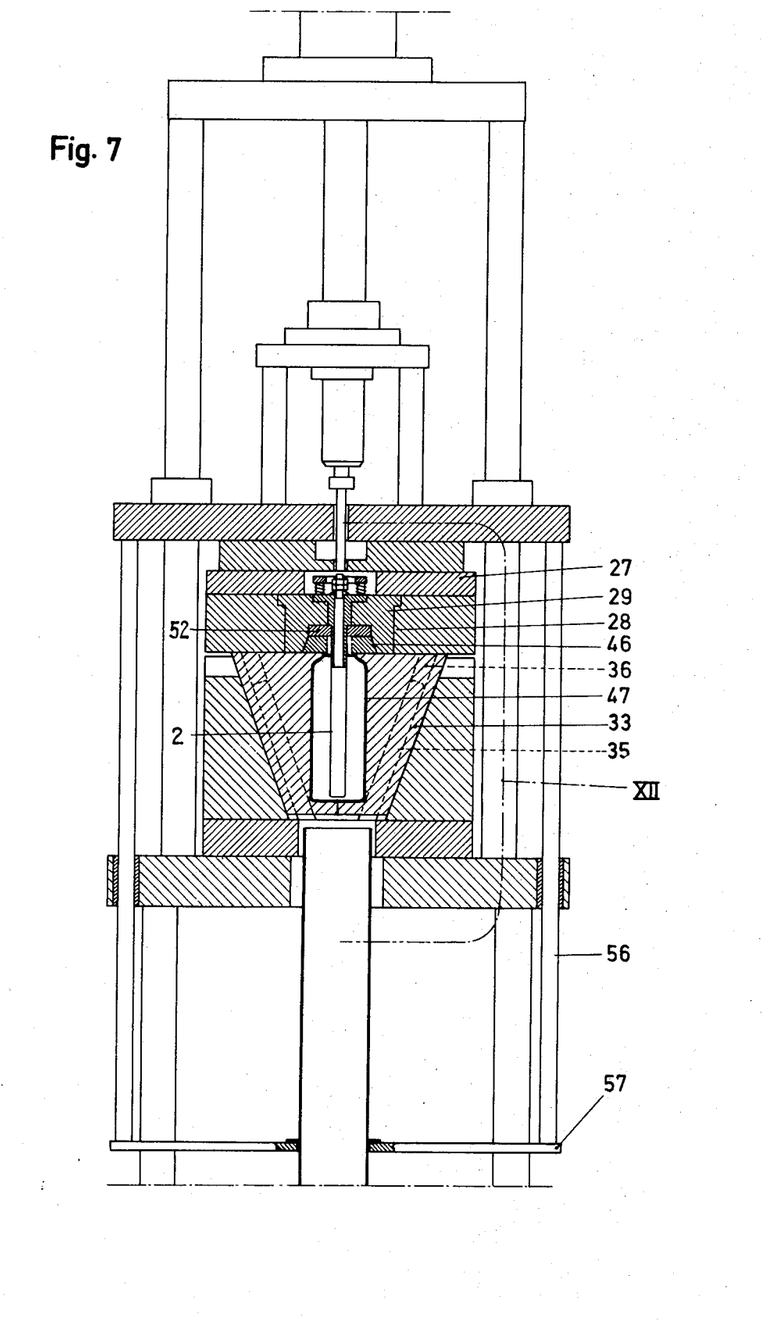
FIG. 7 is a vertical sectional view through the device taken at 90° to FIG. 5.
Figure 8:
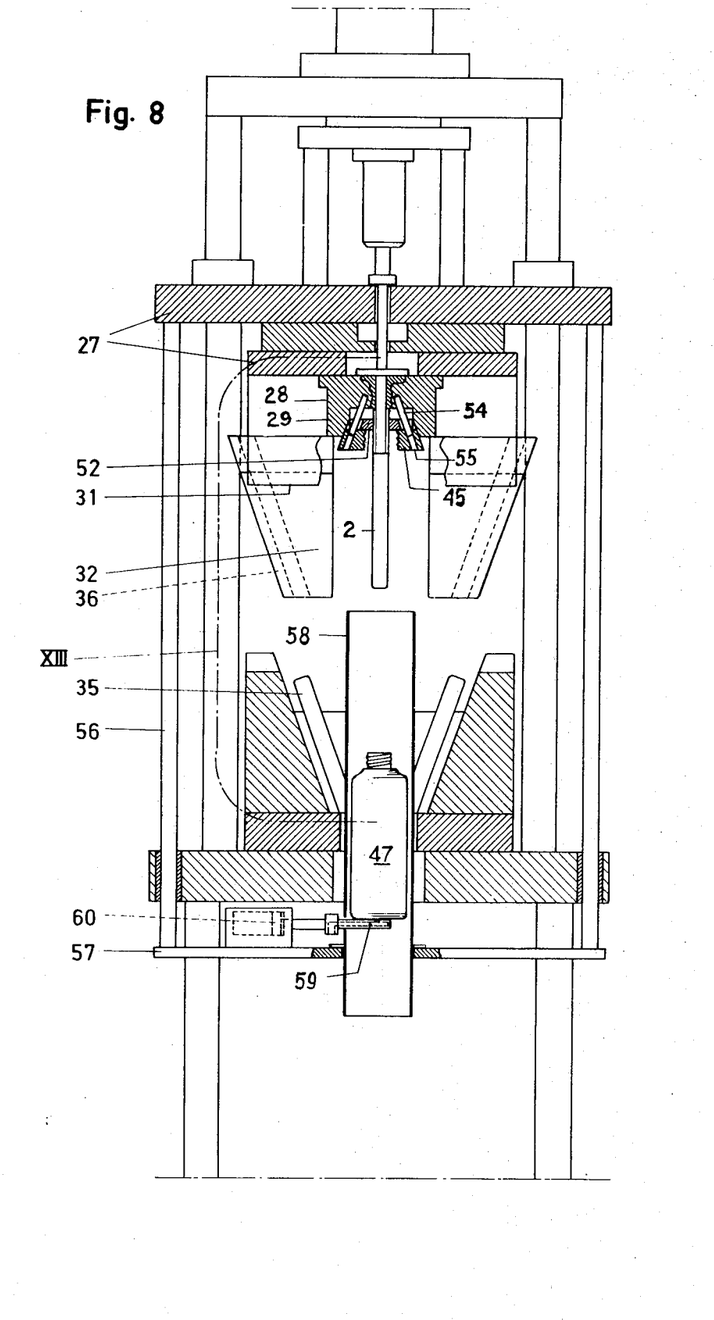
FIG. 8 is a vertical sectional view through the device taken at 90° to FIG. 6.
Figure 9:
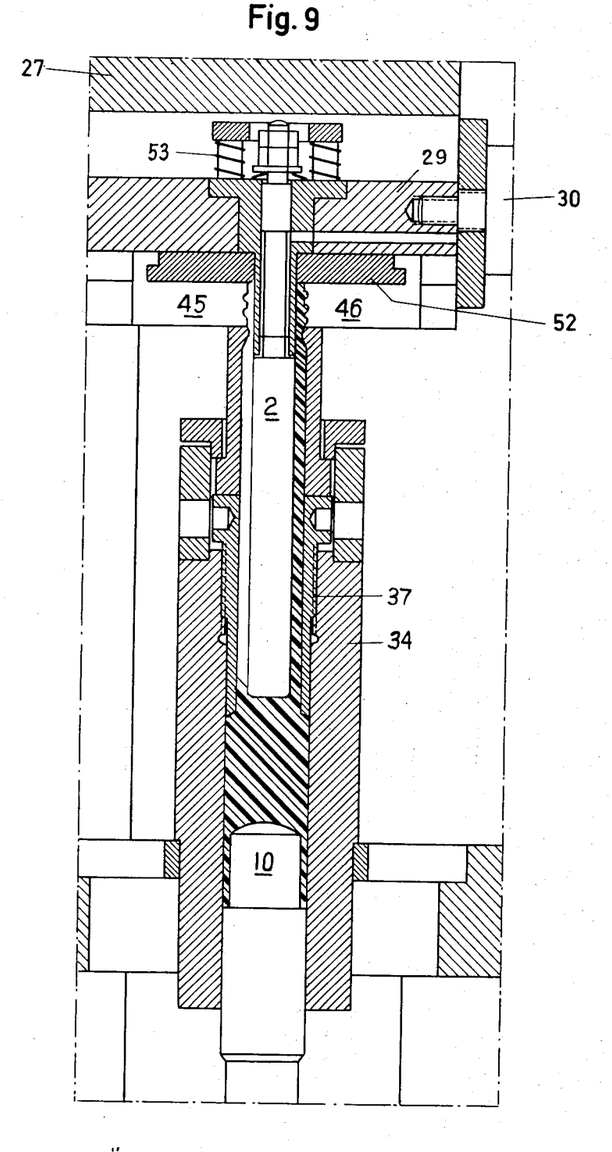
FIG. 9 is a sectional view of the apparatus taken in the area of the device marked with IX in FIG. 5 in larger scale and showing more detail.
Figure 10:
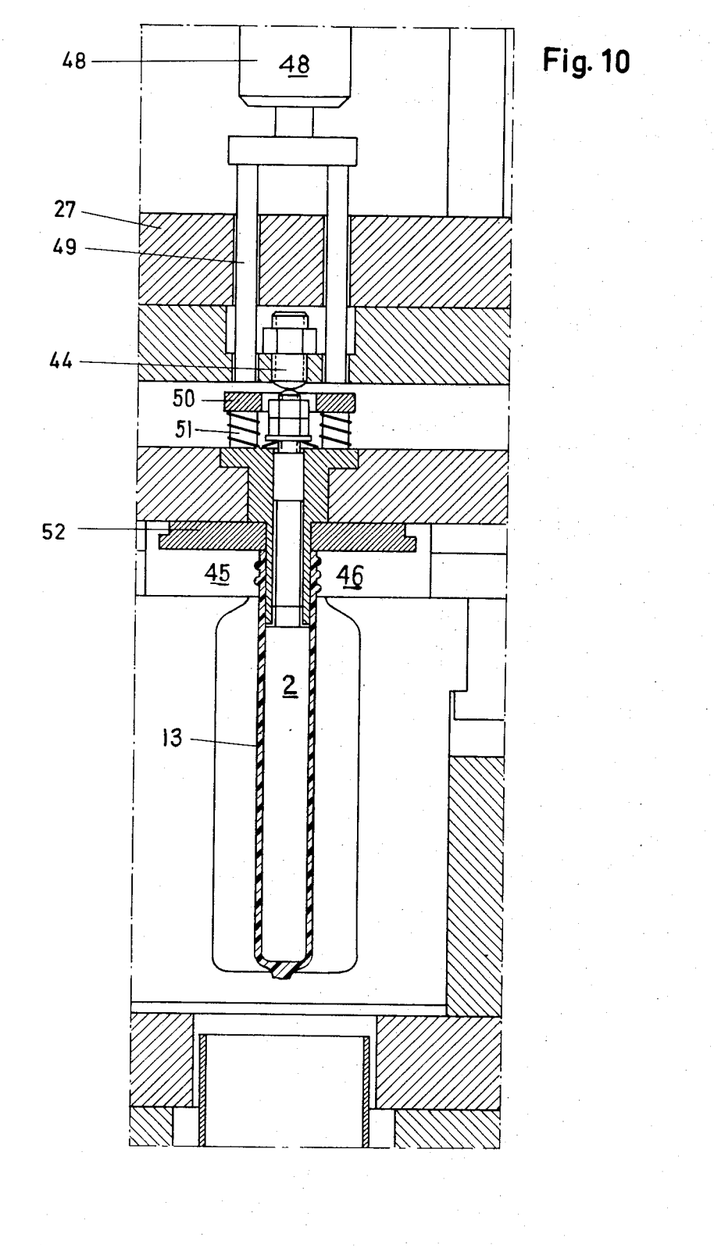
FIG. 10 is a sectional view in the area of the device marked with X in FIG. 5 in larger scale showing more detail.
Figure 11:
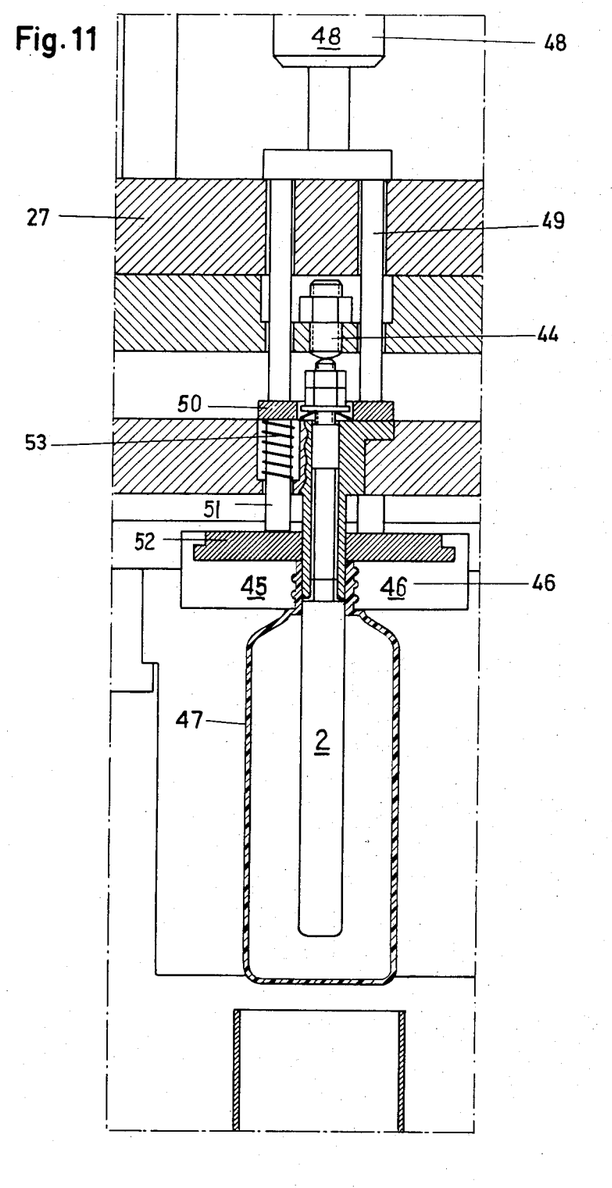
FIG. 11 shows in larger scale the area of the device shown in FIG. 10, but corresponding to the work condition shown in FIG. 6.
Figure 12:
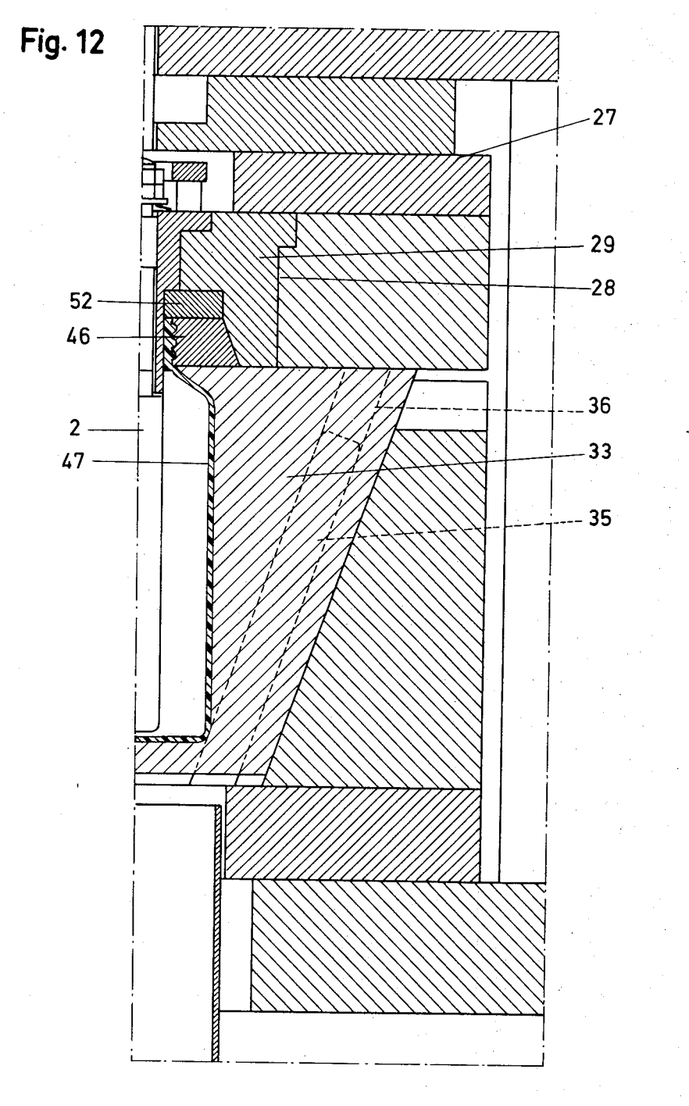
FIG. 12 shows the area indicated by XII in FIG. 7 in large scale and more in detail.
Figure 13:
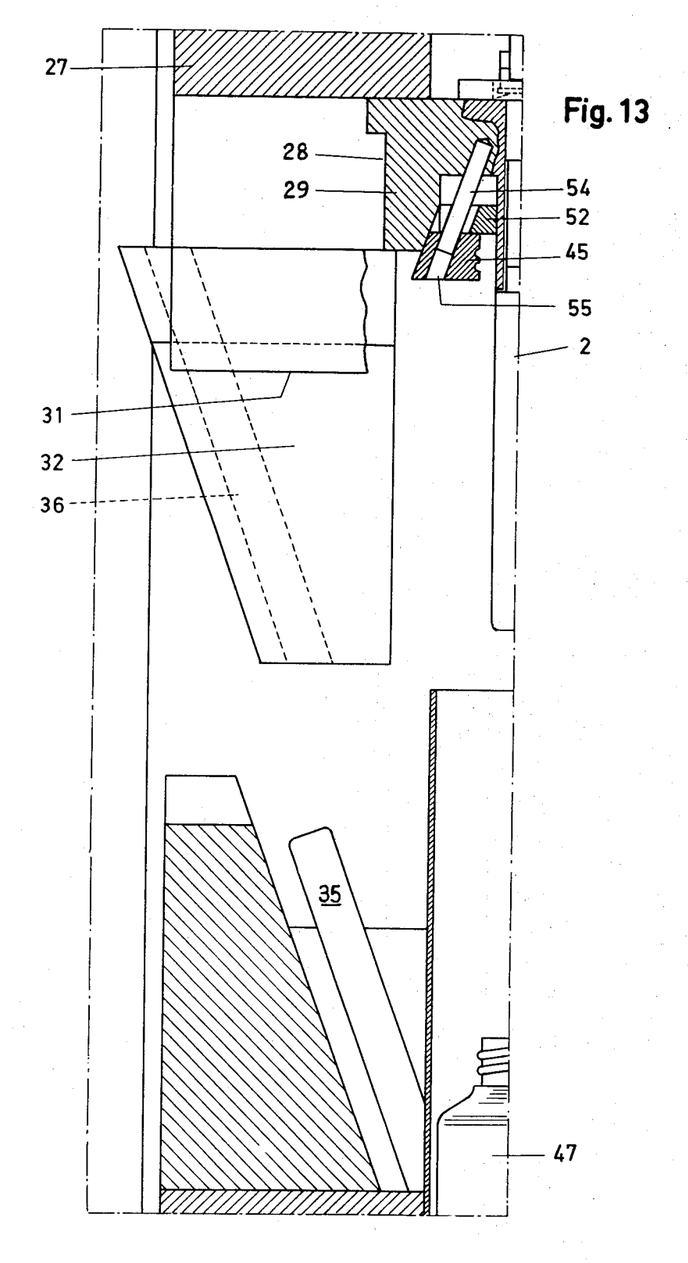
FIG. 13 shows the area indicated by XIII of FIG. 8 in large scale and in more detail.

As can be seen from FIGS. 5 and 6, the piston 10 of the dip pots 34 are movable by hydraulic cylinders, the adjusting movement of these hydraulic cylinders 61 being practically controlled in dependence on the adjusting movement of the hydraulic cylinder 24.

The sleeves 37, for displacing the mouthpieces 4 on the dip pots 34 are designed in such a way that each of their lower ends forms a valve seat into which penetrate the pistons 10 in their upper end position. The pistons 10 serve in their upper end positions for the closure of the dip pots 34 against the plasticizing unit, such as an extruder, so that plasticized material may be guided into the dip pots 34 only when the piston 10 is pulled back from the valve seat.

Naturally, the process of this invention may be used in connection with devices in which the rods 2 are used on the one hand as a core mold for the pre-casts, and on the other hand as a blow rod and are arranged on a turn-table in place of a slide; with such an arrangement the rods 2 are brought within the area of a dip pot, or in the area of the blow mold by a setp-by-step mechanism.

A coating of the blow rods 2 with an anti-adhesion layer, such as polytetrafluorethylene, has the advantage that the pre-cast during the blow operation loosens easily from the circumference.

The blow rods 2 may finally also be used to stretch the pre-cast, which is in the thermo-elastic condition, to achieve in this way, in connection with the stretching of the material during blowing, a structural strengthing of the hollow body. The blow rods 2 can also serve for immediate filling of the finished container.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Apparatus for the fabrication of a hollow article, comprising
   a. a dip pot filled with plasticized material and having a mouthpiece defining an opening,
   b. a closable blow mold consisting of a plurality of sections, the mold being movable in a first direction, from a first position to a second position, the sections being separated from one another in the first position and locked together in the second position,
   c. an elongated blow rod supported at one end and held with its length parallel to the first direction, and having a surface capable of supporting a pre-cast formed of plasticized material, and capable of forming a first annular slot with the opening,
   d. a portable neck mold surrounding a portion of the blow rod, and forming a second annular slot, and e. carriage gear which moves the blow rod
      from a third position wherein the blow rod extends through the first annular slot of the dip pot and into the plasticized material, and the first and second annular slots engage one another,
      along a second direction parallel to the first direction and to the length of the blow rod,
      along a third direction transverse to the first direction, into the blow mold while the blow mold is in its first position, and
      along the first direction causing the mold to move from its first position to its second position and thereby close around the blow rod.

2. Apparatus as recited in claim 1, characterized by the fact that a piston for driving the plasticized material extends into the dip pot on an end of the dip pot opposite the first annular slot and a valve seat is provided within the dip pot, the piston forming a seal with the valve seat.

3. Apparatus as recited in claim 2, characterized by the fact that the valve seat is formed of one end of a sleeve shich extends into the dip pot and is displaceable within the dip pot.

4. Apparatus as recited in claim 3, characterized by the fact that the sleeve 37 forms a mouthpiece on one of its ends which mouthpiece forms with the inserted blow rod the first annular slot.

5. Apparatus as recited in claim 4, characterized by the fact that two blow rods with arranged neck mold are guided and displaceable along the first, second and third lines by a common carrier at a certain distance parallel to each other and can be alternately introduced into the blow mold along the third direction, and that on a second carrier are located two dip pots, the distance between the two dip pots being twice as large as the distance between the two blow rods.

6. Apparatus as recited in claim 3, characterized by the fact that a blow rod carrier and the second carrier for the dip pots are located in a closure press which opens and closes along a work direction parallel to the first direction, and the blow rod carrier is displaceably guided transversely of the work direction of the closure press when the press is open.

7. Apparatus as recited in claim 6, characterized by the fact that the neck mold consists of two halves held in closed position by sloped guide pins and springs and is openable against the spring force by means of push rods operated by a pressure media.

8. Apparatus as recited in claim 7, characterized by the fact that the two neck mold halves 45, 46 are guided displaceably on a stripper plate 52 which forms an upper closure of the neck mold 3 and is maintained by the springs 53 in a rest position on the blow rod carrier 29 and displaceable in a stripper position by push rods 49 against the blow rod carrier 39.

9. Apparatus as recited in claim 8, characterized by the fact that the two blow mold halves 32, 33 are guided displaceably on the blow rod 31 carrier 27 relative to each other transversely of their separation line and transversely to a displacement device of a guide 29 carrying the blow rods 2 and are also moved by sloped guide pins 35 arranged on the dip pot carrier 21 during opening of the closure press, the halves being form-locked away from each other and, during closing, also form-locked against each other.

10. Apparatus as recited in claim 8, characterized by the fact that the blow rods 2 consist of a stationary upper part 38 fastened to the blow rod carrier 29 and an oppositely arranged lower part 39 displaceable relative to the upper part, and where the lower blow rod part 39 is held by the springs 42 against the upper blow rod part 38 and by displacement between the blow rod halves 32, 33 is pushed away with a stationary cam 44 and therefore creates an opening split between the two blow rod parts 38, 39 for the entering of the blowing air.

11. Apparatus as recited in claim 10, characterized by the fact that underneath the blow mold 32, 33 a pipe 58 is arranged which collects the hollow articles 47 pushed out of the blow mold 32, 33 and contains also a cool air jet 59.

12. Apparatus as recited in claim 11, characterized by the fact that the pipe rests in a holding device 56, 57 which is movable together with the blow rod carrier 27 by the closure press 20.

13. Apparatus as recited in claim 11, characterized by the fact that the cool air jet 59 for example may be able to be pulled out of the pipe radially by a pressure media drive 60.

14. Apparatus as recited in claim 13, characterized by the fact that the blow rod 2 and the neck mold 3 are arranged on a turn table and alternately placed into the area of one dip pot 34 and a blow mold 32, 33 by a step-by-step switch.

15. Apparatus as recited in claim 14, characterized by the fact that the blow rods 2 are surrounded by an anti-adhesion layer for example polytetraflourethylene.

* * * * *